(12) United States Patent
Taniguchi et al.

(10) Patent No.: US 10,794,687 B2
(45) Date of Patent: Oct. 6, 2020

(54) SHAPE MEASUREMENT SYSTEM AND SHAPE MEASUREMENT METHOD

(71) Applicant: Hitachi, Ltd., Chiyoda-ku, Tokyo (JP)

(72) Inventors: Atsushi Taniguchi, Tokyo (JP); Masahiro Watanabe, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/928,693

(22) Filed: Mar. 22, 2018

(65) Prior Publication Data

US 2018/0306573 A1    Oct. 25, 2018

(30) Foreign Application Priority Data

Apr. 20, 2017  (JP) .................................. 2017-084020

(51) Int. Cl.
*G01B 11/24*    (2006.01)
*G06T 7/62*    (2017.01)
(Continued)

(52) U.S. Cl.
CPC ........... *G01B 11/24* (2013.01); *G01N 21/954* (2013.01); *G06T 7/001* (2013.01); *G06T 7/579* (2017.01);
(Continued)

(58) Field of Classification Search
CPC ...... G01B 11/24; G01N 21/954; G06T 7/001; G06T 7/579; G06T 7/62; G06T 7/97;
(Continued)

(56) References Cited

U.S. PATENT DOCUMENTS

2002/0171847 A1* 11/2002 Fukumoto .......... G01B 11/2518
356/606
2014/0071243 A1* 3/2014 Nakatsukasa .......... G01B 11/25
348/46
(Continued)

FOREIGN PATENT DOCUMENTS

JP      2006-64690 A    3/2006
JP      2012-2783 A    1/2012

*Primary Examiner* — Joseph G Ustaris
*Assistant Examiner* — Jill D Sechser
(74) *Attorney, Agent, or Firm* — Crowell & Moring LLP (57) ABSTRACT

Provided are a system and a method capable of accurately measuring consecutive shapes of a measurement target even when an imaging means, which captures images of the shape of the measurement target, is moved along the measurement target while irradiating the measurement target with light. The present invention comprises a light source, an irradiating body which irradiates the measurement object with light from the light source, an imaging body which captures images of the measurement object based on the light from the irradiating body with which the measurement object was irradiated, a moving mechanism which causes the irradiating body and the imaging body to move along the measurement object, and a processing unit which executes data processing for measuring the shape of the measurement object based on images of the measurement object, wherein the imaging body incorporates an image of the measurement object at each predetermined timing upon moving along the measurement object, and wherein processing unit determines a cross section shape of the measurement object and a moving mode of the moving mechanism based on images of the measurement object, and measures the shape of the measurement object based on the cross section shape and the moving mode.

7 Claims, 8 Drawing Sheets

(51) Int. Cl.
*G06T 7/00* (2017.01)
*G06T 7/579* (2017.01)
*G01N 21/954* (2006.01)

(52) U.S. Cl.
CPC .............. *G06T 7/62* (2017.01); *G06T 7/97* (2017.01); *G06T 2207/10004* (2013.01); *G06T 2207/10016* (2013.01); *G06T 2207/10024* (2013.01); *G06T 2207/10068* (2013.01); *G06T 2207/30132* (2013.01); *G06T 2207/30136* (2013.01)

(58) Field of Classification Search
CPC . G06T 2207/30136; G06T 2207/10068; G06T 2207/10024; G06T 2207/10016; G06T 2207/30132; G06T 2207/10004
See application file for complete search history.

(56) References Cited

U.S. PATENT DOCUMENTS

| | | | |
|---|---|---|---|
| 2014/0355004 A1* | 12/2014 | Sakai | G01B 11/24 |
| | | | 356/601 |
| 2017/0116738 A1* | 4/2017 | Iida | G01B 11/2522 |
| 2018/0038958 A1* | 2/2018 | Kawazoe | G01S 17/931 |
| 2018/0143009 A1* | 5/2018 | Hibi | G01B 11/24 |
| 2018/0283851 A1* | 10/2018 | Watanabe | G01P 3/36 |
| 2019/0025409 A1* | 1/2019 | Kawazoe | G01S 7/4814 |

\* cited by examiner

SHAPE MEASUREMENT SYSTEM AND SHAPE MEASUREMENT METHOD

TECHNICAL FIELD

The present invention relates to a shape measurement system and a shape measurement method capable of optically measuring, in a non-contact manner, a three-dimensional shape of a measurement target.

BACKGROUND ART

Conventionally, known is a method of optically measuring, in a non-contact manner, a three-dimensional shape of a measurement target; for instance, an inner surface of a tubular body such as a tunnel or a pipe. For example, based on an object of providing an inner surface shape measuring device capable of simultaneously measuring ranging data in a vertical direction along an inner surface of a tubular body and ranging data in a direction inclined at a predetermined angle relative to the vertical direction, calculating a central axis of the tubular body and an inclination angle of the device based on the measured data, and accurately measuring the inner surface of the tubular body by correcting positional coordinates based on the calculated inclination angle even when the measuring device is inclined, PTL 1 discloses an inner surface shape measuring device which three-dimensionally measures an inner surface shape of a tubular body, comprising: first ranging data detection means which irradiates a laser beam in a vertical direction along the inner surface of the tubular body and outputs ranging data of each orientation of the laser beam with which the inner surface of the tubular body was irradiated; second ranging data detection means which irradiates a laser beam in a direction inclined at a predetermined angle relative to the vertical direction along the inner surface of the tubular body and outputs ranging data of each orientation of the laser beam with which the inner surface of the tubular body was irradiated; moving means for moving the first ranging data detection means and the second ranging data detection means in an axial direction of the tubular body; positional coordinates sensing means which detects respective positional coordinates upon moving the first ranging data detection means and the second ranging data detection means with the moving means; and control means which generates a three-dimensional shape of the inner surface of the tubular body by calculating a tilt angle of the moving means and an axis line of the tubular body based on the ranging data detected by the first ranging data detection means and the second ranging data detection means, and correcting the positional coordinates detected by the positional coordinates sensing means based on the calculated tilt angle.

Furthermore, based on an object of providing a tube inner surface shape measuring device capable of accurately and quickly measuring a degraded state of a tube inner surface, PTL 2 discloses a tube inner surface shape measuring device which three-dimensionally measures a surface shape of a tube inner surface, comprising: photo irradiation means which irradiates the tube inner surface by moving a light spot in a circumferential direction along the tube inner surface; imaging means which captures an image of a surface shape of the tube inner surface which was irradiated with the photo irradiation means; moving means which moves the photo irradiation means and the imaging means in an axial direction of the tube inner surface; positional coordinates sensing means which detects positional coordinates of the respective means upon moving the respective means with the moving means; and computing means which computes a three-dimensional surface shape of the tube inner surface based on two-dimensional images captured by the imaging means and the positional coordinates detected by the positional coordinates sensing means.

CITATION LIST

Patent Literature

[PTL 1] Japanese Unexamined Patent Application Publication No. 2012-2783
[PTL 2] Japanese Unexamined Patent Application Publication No. 2006-64690

SUMMARY OF THE INVENTION

Problems to be Solved by the Invention

While PTL 1 and PTL 2 respectively disclose the measurement of a vertical cross section of a tubular body, because the moving direction and moving distance of the imaging means are calculated based on the method of odometry, there is a problem in that the error in shape measurement becomes considerable. An object of the present invention is to provide a system and a method capable of accurately measuring consecutive shapes of a measurement target even when an imaging means, which captures images of the shape of the measurement target, is moved along the measurement target while irradiating the measurement target with light.

Means to Solve the Problems

In order to achieve the foregoing object, the present invention is a shape measurement system which measures a shape of a measurement object, comprising: a light source; an irradiating body which irradiates the measurement object with light from the light source; an imaging body which captures images of the measurement object based on the light from the irradiating body with which the measurement object was irradiated; a moving mechanism which causes the irradiating body and the imaging body to move along the measurement object; and a processing unit which executes data processing for measuring the shape of the measurement object based on images of the measurement object, wherein the imaging body incorporates an image of the measurement object at each predetermined timing upon moving along the measurement object, and wherein processing unit: determines a cross section shape of the measurement object and a moving mode of the moving mechanism based on images of the measurement object; and measures the shape of the measurement object based on the cross section shape and the moving mode.

Advantageous Effects of the Invention

According to the present invention, it is possible to provide a system and a method capable of accurately measuring consecutive shapes of a measurement target even when an imaging means, which captures images of the shape of the measurement target, is moved along the measurement target while irradiating the measurement target with light.

DESCRIPTION OF EMBODIMENTS

An embodiment of the shape measurement system according to the present invention is now explained. The shape measurement system measures consecutive shapes of a measurement target by moving a probe, which comprises a plurality of lasers of different oscillation wavelengths and a color camera, along the measurement target. The shape measurement system calculates and determines the moving mode (moving direction and/or moving distance, etc.) of the probe based on the image data of the measurement target, and can accurately measure the shape of the measurement target based on the image data of the measurement target and the moving mode of the probe while eliminating the error caused by odometry. Because the mechanism for detecting the moving distance of the probe can be omitted by configuring the imaging means in a probe shape, it is also possible to measure a narrow measurement target such as an inner surface of a small duct line having a diameter of roughly several millimeters.

Figure 1:
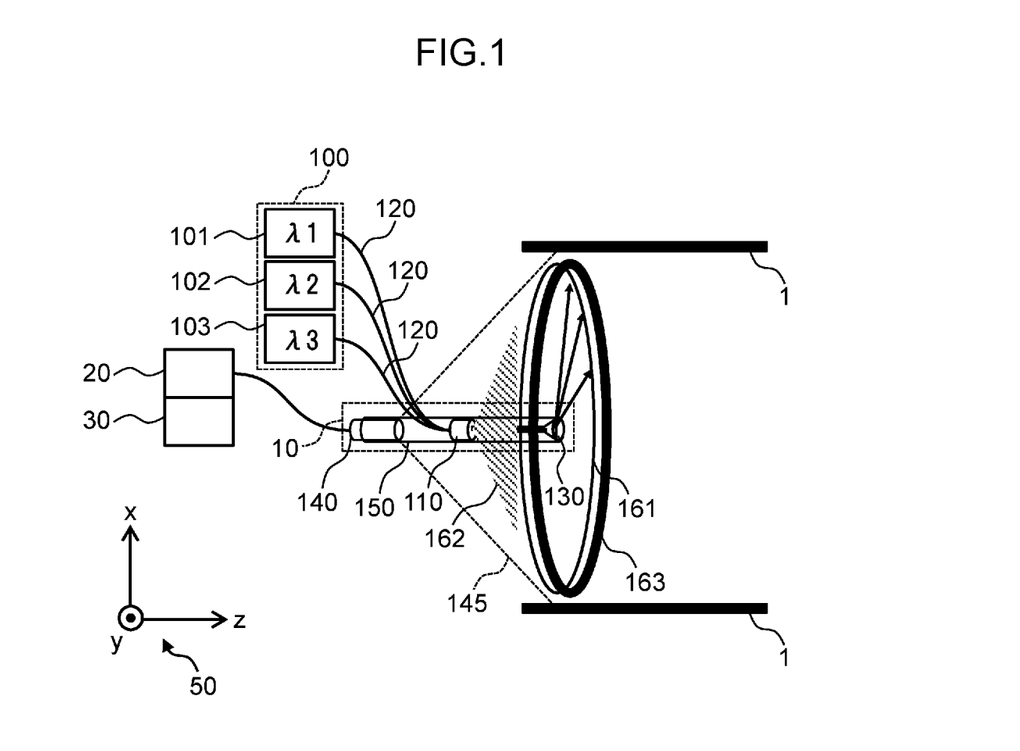
FIG. 1 is a hardware block diagram according to an embodiment of the shape measurement system.

FIG. 1 shows a hardware block diagram of the shape measurement system. The shape measurement system comprises a measurement probe 10 which measures the inner surface shape of a measurement target 1, a processing unit 20 which processes output signals from the measurement probe 10, and a control unit 30 which controls the overall operation of the shape measurement system. The processing unit 20 and the control unit 30 may be respectively configured from separate computers, or from the same computer. The processing unit 20 manages the moving mode (moving direction, posture, position, etc.) of the probe 10 and the shape of the measurement object 1 based on three-dimensional coordinates 50.

The measurement probe 10 which measures the shape of the measurement object 1 comprises an irradiation unit 110, a cone mirror 130 which diffuses light from the irradiation unit 110 into a ring shape, an imaging unit 140 (viewing angle 145) which detects the reflected light and the scattered light resulting from the ring-shaped light coming into contact with the measurement target 1, and a glass tube 150 which connects the irradiation unit 110, the cone mirror 130 and the imaging unit 140. The light source unit 100 and the irradiation unit 110 are connected to an optical fiber 120. The probe 10 is an example of a moving mechanism which moves the irradiation unit 110 and the imaging unit 140 within the measurement target along the measurement target.

Figure 2:
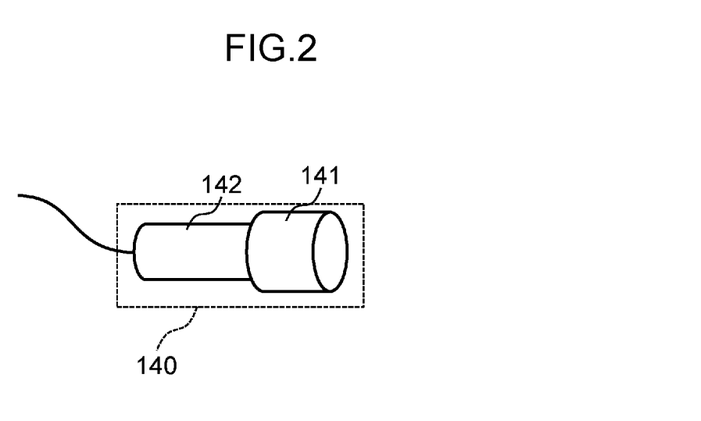
FIG. 2 is a perspective view of an imaging unit of the shape measurement system.

The imaging unit 140 comprises, as shown in the perspective view of FIG. 2, an imaging lens 141 and an RGB color camera 142. In order to miniaturize the measurement probe, the imaging lens 141 may be a small diameter wide angle lens, and the RGB color camera 142 may be an endoscope-type camera.

As shown in FIG. 1, the light source unit 100 comprises light sources that respectively correspond to the wavelengths of the three colors of RGB of the RGB color camera 142. Reference numeral 101 represents the light source of a red laser, reference numeral 102 represents the light source of a green LED, and reference numeral 103 represents a light source of a blue laser. The three types of light are irradiated from the irradiation unit 110.

Figure 3:
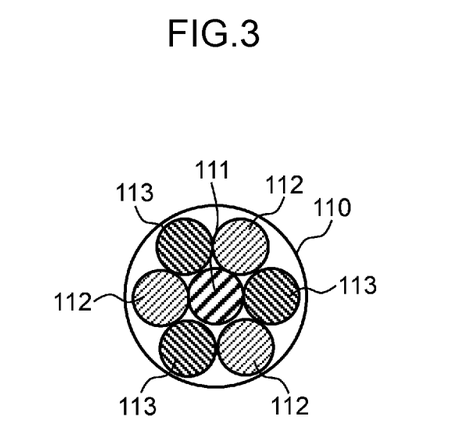
FIG. 3 is a cross section view of an irradiation unit of the shape measurement system in a radial direction.

FIG. 3 shows a cross section view of the irradiation unit 110 in a radial direction. The irradiation unit 110 comprises a plurality of lenses for irradiating the respective lights of RGB. Reference numeral 111 represents a red lens for the light irradiated from the red laser 101 (FIG. 1). Reference numeral 112 represents a green lens for the light irradiated from the green LED 102, and reference numeral 113 represents a blue lens for the light irradiated from the blue laser 103. The red lens 111 is positioned at the center of the irradiation unit 110, and three green lenses 112 and three blue lenses 113 are alternately disposed along the circumferential direction of the red lens 111. The red laser 101 becomes a photo cutting ring beam 161 (FIG. 1) due to the cone mirror 130 and is used to irradiate the measurement target 1.

The red lens 111 narrows the red laser beam to a width of approximately several pixels upon irradiating the measurement target 1. The green lens 112 causes the green LED light to become a wide angle 162 (FIG. 1) upon directly irradiating the measurement target 1. The blue laser beam becomes a speckle ring beam 163 due to the cone mirror 130 and is used to irradiate the measurement target 1. The blue laser beam emitted from the blue lens 113 becomes a width of several ten pixels to several hundred pixels and is used to irradiate the measurement target 1 in a broader range in comparison to the photo cutting ring beam 161.

Figure 4:
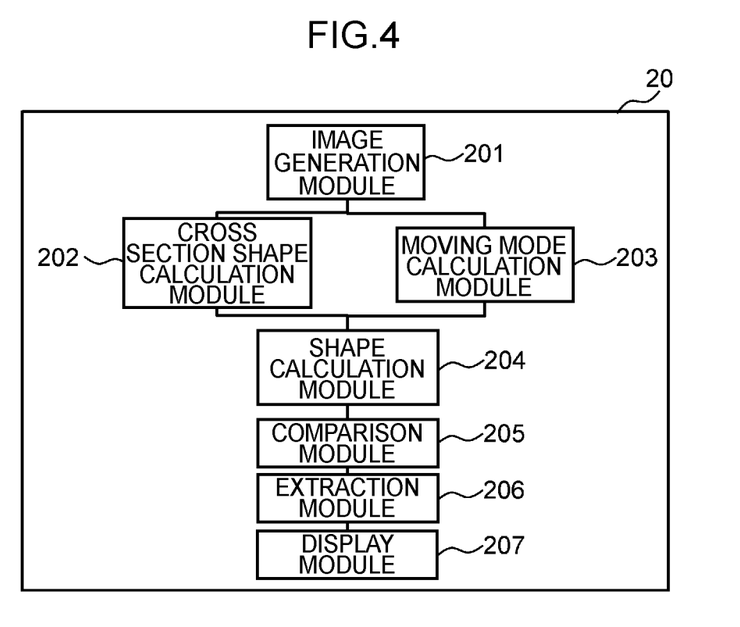
FIG. 4 is a functional block diagram of a processing unit of the shape measurement system.

Details of the processing unit 20 are shown in the functional block diagram of FIG. 4. The processing unit 20 comprises an image generation module 201 which processes the output from the RGB color camera 142 of the imaging unit 140 and respectively generates two-dimensional RGB images, a cross section shape calculation module 202 which calculates and determines the cross section shape of the measurement target 1 from the images generated by the image generation module 201, a moving mode calculation module 203 which calculates and determines the moving direction and moving distance of the measurement probe 10 from the images generated by the image generation module 201, a shape calculation module 204 which calculates the shape of the measurement target 1 by using the cross section shape calculated by the cross section shape calculation module 202 and the moving mode calculated by the moving mode calculation module 203, a comparison module 205 which calculates the difference between the calculation data of the overall shape of the measurement object 1 calculated by the shape calculation module 204 and the design data thereof based on such calculation data and design data, an extraction module 206 which extracts, when the difference calculated by the comparison module 205 exceeds a predetermined threshold, the difference as an abnormal value, and a display module 207 which displays the abnormal value on a screen. The processing unit 20 may use, for instance, SLAM (Simultaneous Localization and Mapping) upon calculating the moving mode of the probe 10. Note that a "module" is a configuration that is realized by the control resource (controller) of the computer executing a computer application program such as a measurement program.

Figure 5:
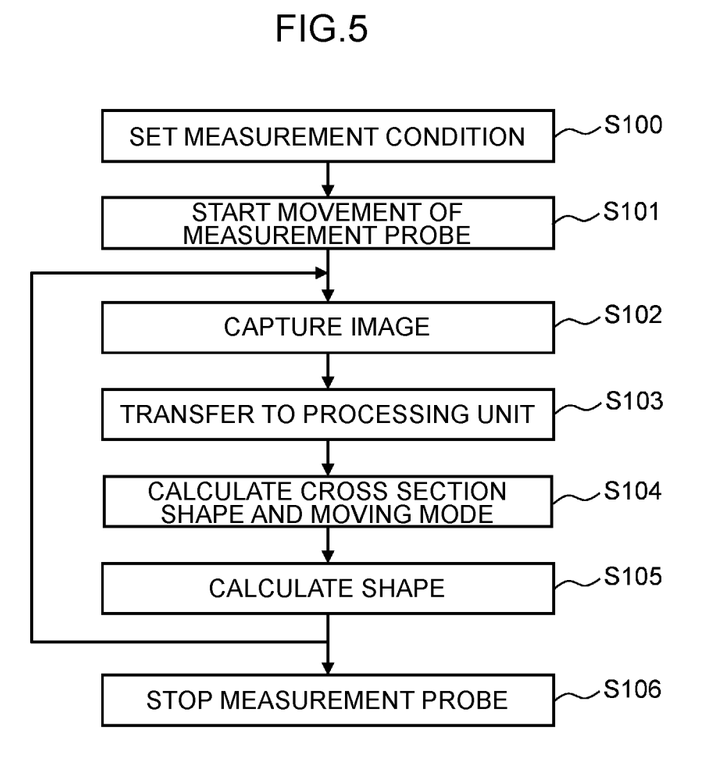
FIG. 5 is a flowchart of the measurement operation performed by the shape measurement system.

The control unit 30 of FIG. 1 controls the movement of the measurement probe 10 and the operation of the processing unit 20 for measuring the three-dimensional shape of the measurement target 1. The flowchart of the measurement operation performed by the shape measurement system is shown in FIG. 5. Measurement conditions such as the rate that images are acquired by the measurement probe 10 from an input device (not shown) and the laser output are set in the control unit 30 (S100). Next, the control unit 30 causes the imaging unit 140 to start the imaging process, and causes the measurement probe 10 to start moving manually or automatically (S101). The measurement system may apply publicly known moving systems for moving the measurement probe 10 such as hand-held hand movement, automatic positioning stage, or UAV (Unmanned Air Vehicle).

The measurement probe 10, while moving, acquires images of the measurement target 1 from the RGB color camera 142 (S102), and transfers the image data to the processing unit 20 via wired or wireless transmission (S103). The processing unit 20 stores the image data in a memory, calculates information of the cross section shape of the measurement target 1 as well as the moving mode (vector of the probe 10) including the position of the measurement probe 10 and the moving direction (direction of x, y, z) of the measurement probe 10 from the image data (S104), and calculates the shape of the measurement target based on SLAM processing (S105). The processing unit 20 calculates the overall shape of the measurement target by repeating steps S102 to S105 until the measurement is ended, subsequently stops the movement of the measurement probe 10, and then ends the acquisition of images of the measurement target (S106). Note that, while the processing unit 20 calculates the shape of the measurement target (cross section shape and direction of the measurement target) each time that the image data is acquired, the shape of the measurement target may also be calculated after all image data of the measurement target have been acquired.

Figure 6:
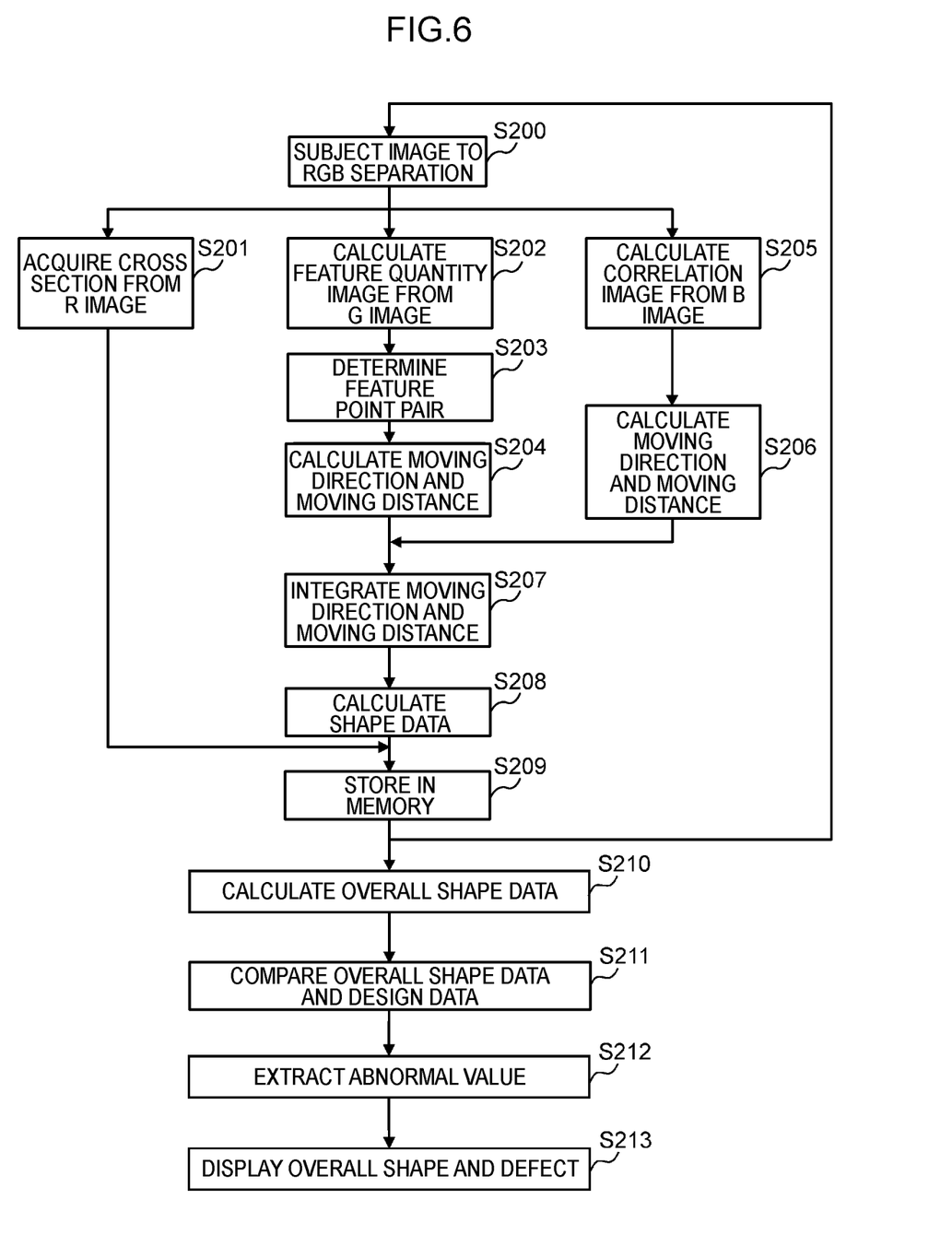
FIG. 6 is a flowchart of the operation performed by the processing unit of the shape measurement system.

The operation of the processing unit 20 is now explained based on the flowchart of FIG. 6. The processing unit 20 calculates the shape of the measurement target 1 based on the images captured by the measurement probe 10 as follows, and subsequently performs comparison processing and displays the results.

Figure 7A:
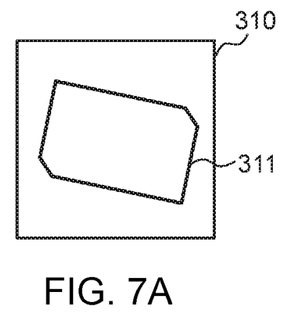
FIGS. 7A to 7C are images of the measurement object in which the image of the imaging unit of the shape measurement system is broken down in each of RGB.
Figure 7B:
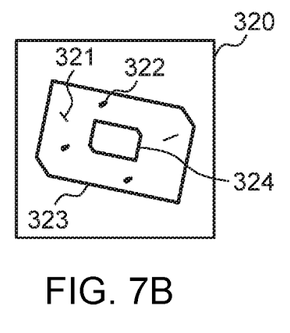
Figure 7C:
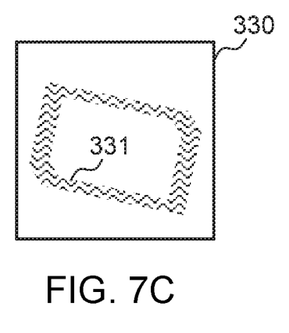

The image generation module 201 separates the images of the measurement target 1 that the imaging unit 140 acquired from the RGB color camera 142 into RGB components (S200). The images respectively separated into RGB are shown in FIG. 7. An R image 310 of FIG. 7(A) shows a photo cutting line 311 that is generated based on the reflected light or scattered light that was reflected or scattered when the measurement target 1 was irradiated with the photo cutting ring beam 161 (FIG. 1). The photo cutting line 311 corresponds to the shape of the lateral cross section of the measurement target (inner surface of the duct line).

A G image 320 of FIG. 7(B) shows an image acquired based on the irradiation of the green LED 10; that is, a stereo image acquired via the imaging lens 141 along the moving direction of the probe 10. Reference numeral 324 represents the opening of the duct line that is visible at the front of the probe 10, reference numeral 321 represents a scratch on the duct line inner surface, reference numeral 322 represents an image of unevenness, and reference numeral 323 represents the edge of the duct line. Scratches and the like are used as the surface features of the measurement target 1. This will be explained later.

A B image 330 of FIG. 7(C) shows a speckle 331 based on the reflected light and the scattered light that are reflected or scattered when the measurement target is irradiated with the speckle ring beam 163 at a width of approximately several ten to several hundred pixels. Because the light source is a laser, a speckle dependent on the captured surface condition of the measurement target 1 is generated.

Figure 8:
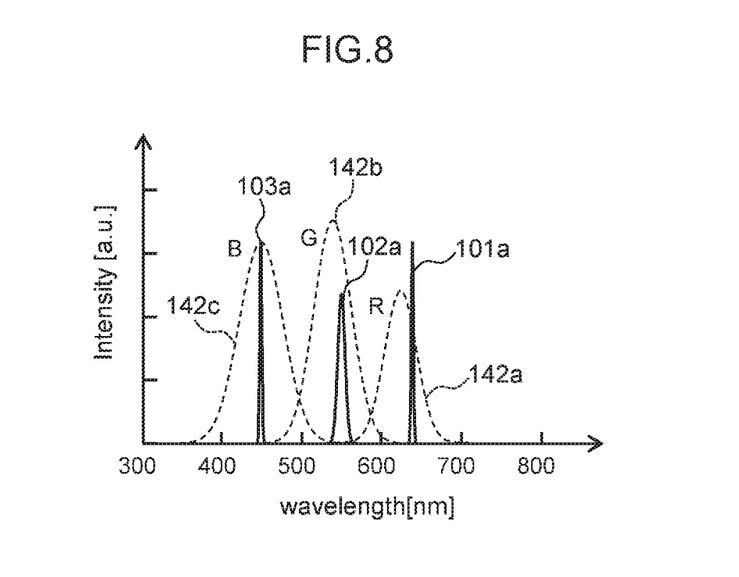
FIG. 8 is a characteristic diagram showing the relation of the transmittance of RGB and the wavelength of each light source.

FIG. 8 shows the characteristics of the relation between the transmittance of RGB of the RGB color camera 142 and the wavelength of the respective light sources. These characteristics include R transmittance 142$a$, G transmittance 142$b$, and B transmittance 142$c$. The image generation module 201 sets a red laser wavelength 101$a$ ($\lambda_1$: FIG. 1) near the wavelength of the maximum value of the R transmittance 142$a$, sets a green LED wavelength 102$a$ ($\lambda_2$) near the wavelength of the maximum value of the G transmittance 142$b$, and sets a blue laser wavelength 103$a$ ($\lambda_3$) near the wavelength of the maximum value of the B transmittance 142$c$. The green LED wavelength 102$a$ has a broad spectral band width in comparison to the red laser wavelength 101$a$ and the blue laser wavelength 103$a$.

Figure 9:
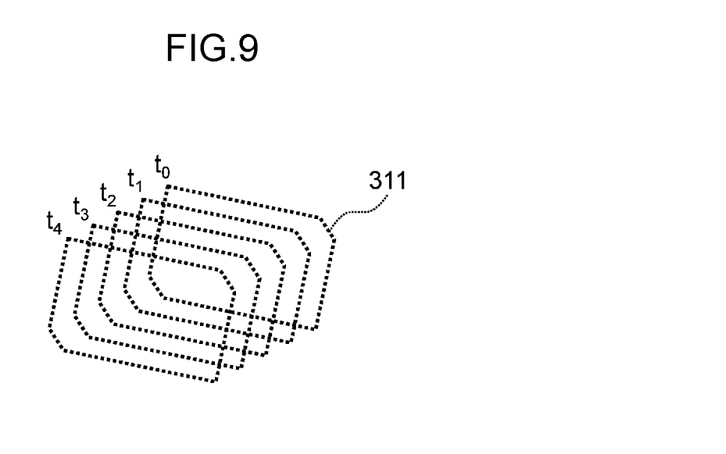
FIG. 9 is a cross section shape at each measurement timing of the measurement object.

Next, the cross section shape calculation module 202 acquires the cross section shape of the measurement target 1, based on the optical cutting method, from the R image 310 among the three types of images obtained from the respective components of RGB (S201). FIG. 9 shows the acquired cross section shape 312. $t_0$ to $t_4$ represent the temporal transition of measurement, and the cross section shape calculation module 202 determines the cross section shape 312 at each measurement timing.

In S202, the moving mode calculation module 203 extracts the feature points consisting of the scratch 321, the unevenness 322, and the edge 323 shown in FIG. 7(B) regarding the two G images 320 acquired consecutively in terms of time, and thereby calculates the feature quantity image. The moving mode calculation module 203 may apply edge extraction or SIFT (Scale-Invariant Feature Transform) upon calculating the feature quantity.

The moving distance calculation module 203 determines a pair of the same feature points regarding two consecutive images among the plurality of stereo images 320 acquired at each predetermined timing; for instance, at each unit time $t_n$ (n=0, 1, 2 . . . ) (S203), compares the feature points configuring the pair, and calculates the distance and angle of the two consecutive images at each unit time as the moving direction and moving distance 325$r_n$ of the measurement probe 10 (S204). Note that the accuracy of the moving direction and moving distance of the measurement probe 10 can be improved by using more consecutive images without limitation to two consecutive images.

The moving mode calculation module 203 additionally acquires the correlation of two B images 330 acquired at each unit time $t_n$ (n=0, 1, 2 . . . ) and calculates the correlation image (S205), and calculates the moving direction and moving distance $335 s_n$ of the probe 10 at each unit time (S206). The moving distance calculation module 203 may apply the method referred to as the speckle correlation method upon calculating the correlation image. Note that the accuracy of the moving direction and moving distance of the measurement probe 10 can be improved by using more images without limitation to two consecutive images.

Figure 10:
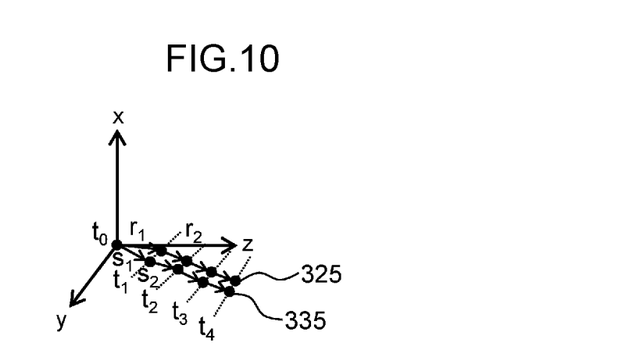
FIG. 10 is a moving mode of a probe which is calculated respectively from a G image and a B image.

The moving mode of the probe calculated from the G image and the B image is shown in FIG. 10. FIG. 10 shows the coordinates of the movement locus of the probe at each unit time $t_n$ (n=0, 1, 2 . . . ) on the x, y, z coordinates. Reference numeral 325 represents the coordinates of the locus ($r_n$: n=1, 2, 3 . . . ) of the movement of the probe obtained from the G image 320, and reference numeral 335 represents the coordinates of the locus ($S_n$: n=1, 2, 3 . . . ) of the movement of the probe obtained from the B image 330.

As evident from FIG. 10, there is a slight difference between the two loci. This difference is due to the difference in the characteristics between the green LED 102 and the blue laser 103. Thus, the moving mode calculation module 203 integrates the two movement loci $r_n$ and $s_n$, for example, by using the following formula (S207):

$$u_n=(m_1 r_n + m_2 s_n)/2 \quad \text{Formula 1}$$

(n=0, 1, 2 . . . )

$m_1$, $m_2$ ($m_1+m_2=1$) each represents the weighting function, and the moving mode calculation module 203 may suitably set $m_1$, $m_2$ based on the condition of the measurement target.

The reason why the moving mode calculation module 203 integrates the two movement loci as described above is as follows. Because the illumination light having the wavelength of the green LED light source 102 is able to irradiate a broad area of the measurement target, the G image 320 can include information that is far from the imaging lens 141. Accordingly, when the processing unit 20 calculates the moving mode of the probe 10 by using the feature points of the G image 320, the accuracy of the moving direction of the probe 10 tends to improve.

Meanwhile, because light having the wavelength of the blue laser light source 103 irradiates a narrow area of the measurement target, the moving mode of the probe 10 is calculated based on the speckle correlation of a narrow range in the B image 330. Accordingly, the accuracy of the moving distance of the probe 10 tends to improve.

Because there are advantages and disadvantages depending on the characteristics of the light as described above, the moving mode calculation module 203 can calculate the moving mode of the probe with high accuracy by evenly weighing and combining the two movement loci $r_n$ and $s_n$. The moving mode calculation module 203 may also strengthen/weaken the weighting function $m_1$, $m_2$ according to the differences in the measurement targets. For example, because high precision mechanical components that were subject to surface finishing hardly have any textures such as scratches, the moving mode calculation module 203 can easily calculate the moving mode of the probe 10 based on the image features using the G image 320. Thus, the moving mode calculation module 203 may increase the weighting function $m_2$ using a speckle. Meanwhile, with a measurement target having numerous surface textures, the weighting function $m_1$ may be contrarily increased. The moving mode calculation module 203 calculates the moving mode (moving direction) of the probe 10 based on the locus of "$u_n$". Note that the formula for integrating the movement loci $r_n$ and $s_n$ of the probe is not limited to Formula 1.

The shape calculation module 204 determines the direction of the cross section shape of the measurement target (direction of the normal passing through the center of the cross section) in the spatial coordinates according to the cross section shape data (S201) of the unit time and the moving mode (S207) of the measurement probe 10 (S208), and stores the determined direction of the cross section shape of the measurement target in the memory (S208). The processing unit 20 repeats the processing of S200 to S208 at each unit time until the movement of the probe 10 is completed. The cross section shape calculation module 202 also stores the shape data (S201) in the memory. The memory will consequently store the cross section shape data (including the direction of the cross section) that was calculated together with the movement of the probe 10 at each unit time. Note that the calculation module 204 may apply the SLAM technique upon determining the cross section shape. As the SLAM technique, there are, for example, a method that uses a Kalman filter and a method that uses a particle filter.

Figure 11:
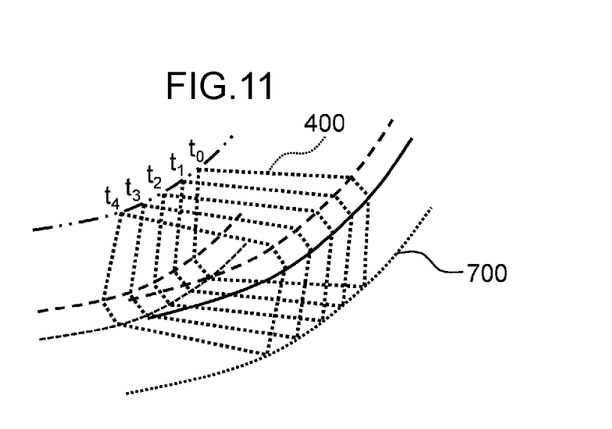
FIG. 11 is real shape data of the overall measurement target.

The shape calculation module 204 can create real shape data 700 of the overall measurement target 1 by sequentially connecting all cross section shapes at each unit time according to the moving mode of the probe (vector of the probe) as shown in FIG. 11 (S210).

Next, the comparison module 205 can compare the real shape data with the design data of the measurement target, and thereby detect, extract, determine or judge the differences between the two (S211). The abnormality extraction module 206 extracts the differences between the real shape data 400 and the design data, such as the distortion, deformation and defects on the inner surface, which exceed a pre-set standard or threshold, as abnormal values (S212), and determines the position information of the extracted abnormal values. The display module 207 displays the strong/weak textures of the abnormal values in the areas where abnormal values arose in the real shape data 400 based on the abnormal values and their position information (S213).

The measurement system described above can accurately measure the overall shape of the measurement object even when an imaging means, which captures images of the shape of the measurement target, is moved along the measurement target while irradiating the measurement target 1 with light. Furthermore, because the moving mechanism of the imaging means does not require the control of the moving position based on the odometry method, the moving mechanism can be miniaturized and simplified. Thus, even when the measurement object is a narrow duct line system, it is possible to measure the inner shape thereof.

Figure 12:
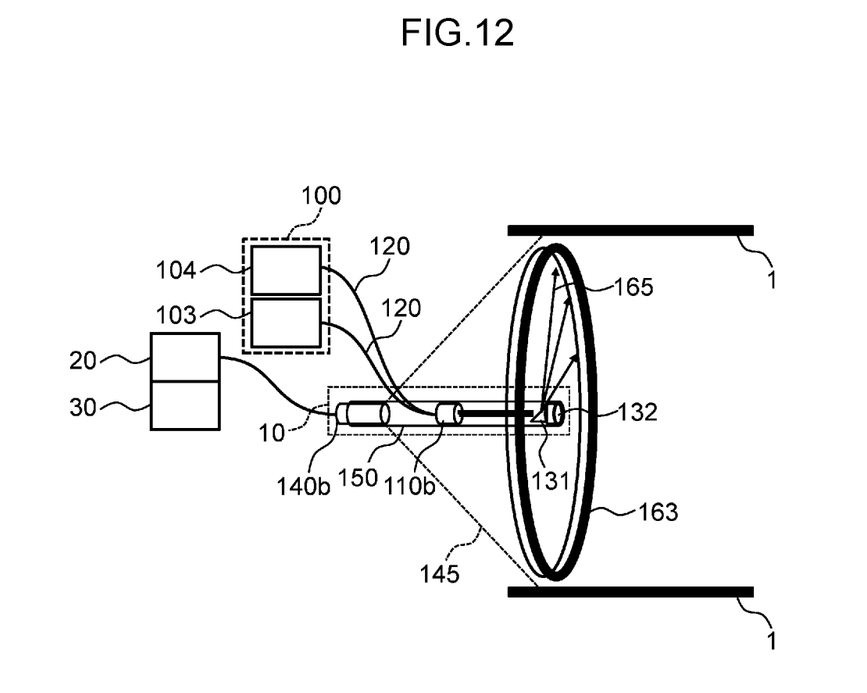
FIG. 12 is a hardware block diagram of a measurement system according to the second embodiment.

The second embodiment of the present invention is now explained with reference to FIG. 12 to FIG. 14. The second embodiment differs from the foregoing embodiment with respect to the points of using a ranging laser, and not a photo cutting ring beam, for measuring the cross section shape of the measurement object 1, and calculating the moving mode of the measurement probe 10 from a speckle image. FIG. 12 shows a hardware block diagram of the measurement system according to the second embodiment. The measurement system guides a ranging laser 165 from a ranging unit 104 of the light source unit 100 to a lens 115 (FIG. 13) of an irradiation unit 110b via an optical fiber 120, and irradiates the inner surface of the measurement target 1, via a prism 131, with the ranging laser 165 emitted from the irradiation unit. The measurement system returns the reflected light and scattered light from the measurement target 1 to the ranging unit 104 via the same optical fiber 120, and thereby measures the distance. The prism 131 is mounted on a rotary motor 132, and the prism 131 is rotated, and the ranging laser 165 is also rotated, by rotating the rotary motor 132. The cross section shape of the measurement target 1 is thereby measured.

As the ranging unit 104, an optical comb, FMCW (Frequency Modulated Continuous Wave), or OCT (Optical Coherent Tomography) may be used. The imaging unit 140b is equipped with a monochromatic camera, and captures the measurement object 1 based on the speckle ring beam 163 with which the measurement object 1 was irradiated.

Figure 13:
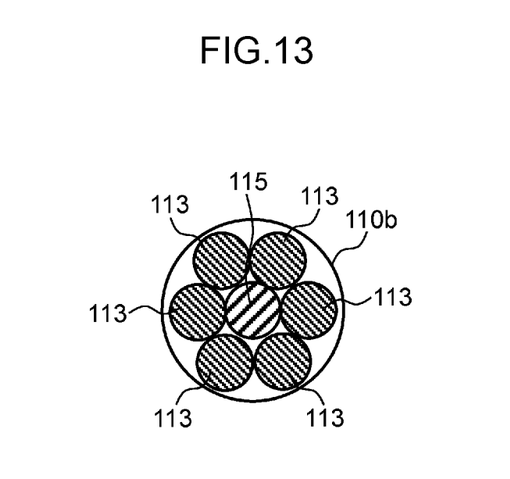
FIG. 13 is a cross section view of an irradiation unit of the measurement system according to the second embodiment.

The cross section configuration of the irradiation unit 110b is shown in FIG. 13. The ranging laser lens 115 exists at the center of the irradiation unit. This lens condenses the reflected light from the measurement target 1. A plurality of blue lenses 113 are evenly disposed around the ranging laser lens 115. The wavelength range of the ranging laser and the wavelength range of the blue laser 103 for use in speckle measurement may be separate wavelength bands that do not influence each other's detection.

Figure 14:
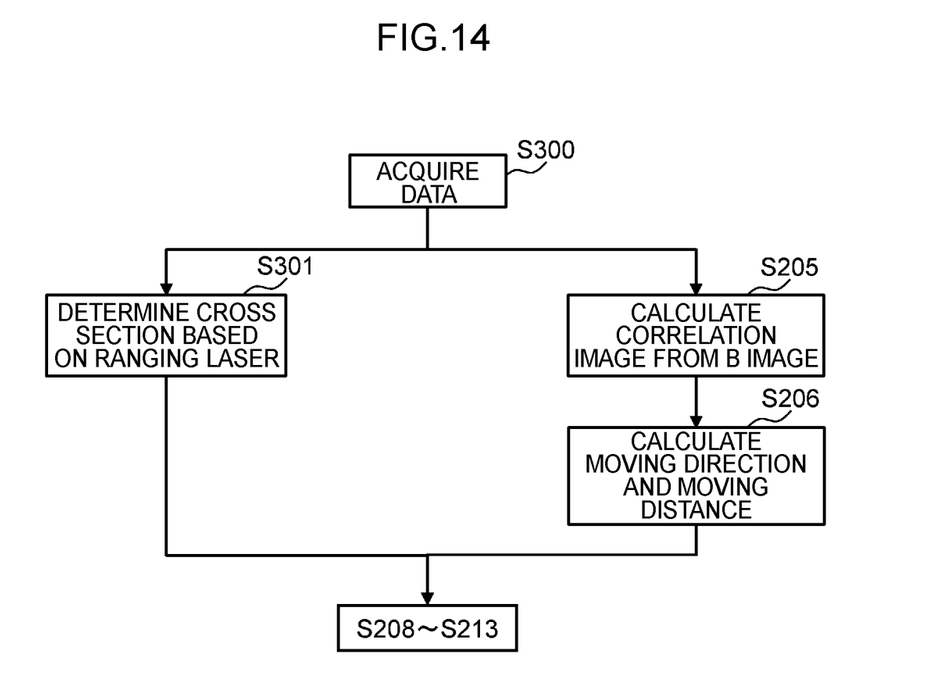
FIG. 14 is a flowchart of the operation performed by a processing unit of the measurement system according to the second embodiment.

The flowchart of the operation of the processing unit 20 is shown in FIG. 14. The processing unit 20 acquires data of scattered light and the like based on the ranging system 104, and the monochromatic camera 140b of the imaging unit 140b (S300). The cross section shape calculation module 202 calculates the cross section shape of the measurement object from the measurement result of the distance of the ranging unit 104 and the rotating speed of the rotary motor 132 (S301). The moving mode calculation module 203 calculates the correlation image (S206), and calculates the moving mode (moving direction and moving distance) $s_n$ of the probe 10 at each time $t_n$ (n=0, 1, 2 . . . ) (S206). The moving mode calculation module 203 does not perform the weighting calculation (S207) described above because the G image 320 is not used in the calculation of the moving mode of the probe 10. The subsequent operation of the flowchart of FIG. 14 is the same as the processing of S208 to S213 described above.

According to the measurement system of the second embodiment, in comparison to the photo cutting method, the shape measurement accuracy upon measuring the measurement target can be improved. Furthermore, because the processing unit 20 uses monochromatic images upon calculating the moving direction and moving distance of the probe 10, measurement of higher resolution is enabled in comparison to color images, and the measurement accuracy based on the speckle correlation method can be improved.

Embodiments of the present invention are not limited to those described above. For example, the measurement target is not limited to a narrow duct line, and the present invention can also be applied to a large measurement object such as a tunnel. The foregoing embodiments merely illustrate examples that are embodied upon implementing the present invention, and the technical scope of the present invention should not be interpreted in a limited manner based on such embodiments. In other words, the present invention may be implemented in various forms without deviating from the technical concept or other primary features thereof.

REFERENCE SIGNS LIST

1 . . . measurement target
10 . . . measurement probe
20 . . . processing unit
30 . . . control unit
100 . . . light source unit

The invention claimed is:

1. A shape measurement system which measures a shape of a measurement object, comprising:
a light source;
an irradiating body which irradiates the measurement object with light from the light source;
an imaging body which captures images of the measurement object based on the light from the irradiating body with which the measurement object was irradiated;
a moving mechanism which causes the irradiating body and the imaging body to move along the measurement object; and
a processing unit which executes data processing for measuring the shape of the measurement object based on images of the measurement object,
wherein the imaging body incorporates an image of the measurement object at each predetermined timing upon moving along the measurement object, and
wherein processing unit:
determines a cross section shape of the measurement object and a moving mode of the moving mechanism moving the irradiating body and the imaging body based on images of the measurement object; and
measures the shape of the measurement object based on the cross section shape and the moving mode of the moving mechanism;
wherein the irradiating body irradiates the measurement object with a first laser beam and a second laser beam, and
wherein the processing unit:
determines the cross section shape from images of the measurement object based on the first laser beam; and
determines the moving mode of the moving mechanism from images of the measurement object based on the second laser beam.

2. The shape measurement system according to claim 1, wherein the irradiating body irradiates the measurement object with a laser beam, and
wherein the processing unit determines the cross section shape from images of the measurement object based on the laser beam.

3. The shape measurement system according to claim 2, wherein the irradiating body irradiates the measurement object with LED light, and
wherein the processing unit determines the moving mode of the moving mechanism by using images of the measurement object based on the LED light.

4. The shape measurement system according to claim 2, wherein the irradiating body irradiates the measurement object with LED light, and
wherein the processing unit determines the moving mode of the moving mechanism from images of the measurement object based on the LED light and images of the measurement object based on a second laser beam.

5. The shape measurement system according to claim 1, wherein the processing unit:
determines the cross section shape of the measurement object by using an optical cutting method based on the first laser beam; and
determines the moving mode of the moving mechanism from a speckle correlation value in images of the measurement object based on the second laser beam.

6. The shape measurement system according to claim 1, wherein the processing unit measures the shape of the measurement object by causing a plurality of cross section shapes of the measurement object to be continuous according to the moving mode of the moving mechanism.

7. A shape measurement method which measures a shape of a measurement object, comprising the steps of:
- irradiating the measurement object with light from a light source;
- capturing images of the measurement object based on the light with which the measurement object was irradiated;
- incorporating an image of the measurement object at each predetermined timing while moving an irradiating body of the light and an imaging body which captures images of the measurement object along the measurement object;
- determining a cross section shape of the measurement object and a moving mode of a moving mechanism moving the irradiating body and the imaging body based on images of the measurement object; and
- measuring the shape of the measurement object based on the cross section shape and the moving mode;
- wherein the irradiating body irradiates the measurement object with a first laser beam and a second laser beam, and
- wherein the processing unit:
- determines the cross section shape from images of the measurement object based on the first laser beam; and
- determines the moving mode of the moving mechanism from images of the measurement object based on the second laser beam.

\* \* \* \* \*